(12) United States Patent
Mangiaracina

(10) Patent No.: US 8,274,227 B2
(45) Date of Patent: Sep. 25, 2012

(54) HIGH-EFFICIENCY DC BALLAST ARRANGEMENT WITH AUTOMATIC POLARITY PROTECTION AND EMERGENCY BACK-UP FOR LIGHTING FIXTURE IN A SUSPENDED DC-POWERED CEILING SYSTEM

(75) Inventor: Anthony Mangiaracina, Mobile, AL (US)

(73) Assignee: Nextek Power Systems, Inc., Detroit, MI (US)

( * ) Notice: Subject to any disclaimer, the term of this patent is extended or adjusted under 35 U.S.C. 154(b) by 322 days.

(21) Appl. No.: 12/774,928

(22) Filed: May 6, 2010

(65) Prior Publication Data
US 2011/0273018 A1 Nov. 10, 2011

(51) Int. Cl.
*H05B 37/00* (2006.01)
*H05B 41/14* (2006.01)

(52) U.S. Cl. .......... 315/86; 315/87; 315/160; 315/200 R

(58) Field of Classification Search .......... None
See application file for complete search history.

(56) References Cited

U.S. PATENT DOCUMENTS

| | | | |
|---|---|---|---|
| 4,001,571 A | 1/1977 | Martin | |
| 4,423,456 A | 12/1983 | Zaidenweber | |
| 5,646,486 A | 7/1997 | Edwards et al. | |
| 5,661,412 A * | 8/1997 | Chawla et al. | 326/38 |
| 5,661,420 A | 8/1997 | Killion et al. | |
| 6,628,083 B2 * | 9/2003 | Pickering | 315/86 |
| 6,815,845 B1 | 11/2004 | McCallum | |
| 7,202,643 B2 | 4/2007 | Miftakhutdinov | |
| 7,661,229 B2 | 2/2010 | Frecska et al. | |
| 7,728,525 B2 * | 6/2010 | Bakre | 315/86 |
| 2004/0232775 A1 | 11/2004 | Nilssen | |
| 2006/0009071 A1 | 1/2006 | Laukhuf | |

* cited by examiner

*Primary Examiner* — Anh Tran
(74) *Attorney, Agent, or Firm* — Kirschstein, et al

(57) ABSTRACT

A high-efficiency ballast arrangement for a lighting fixture has an automatic polarity protection circuit for supplying an output DC voltage of constant polarity no matter in which orientation the fixture is mounted in a DC-powered suspended ceiling system having a DC power supply. A main DC ballast circuit includes a main DC ballast powered by the output DC voltage from the protection circuit to enable a lamp in the fixture to be illuminated during normal operation. An emergency back-up DC ballast circuit includes a battery charged to a charged DC voltage by the output DC voltage during the normal operation, and an emergency DC ballast powered by the charged DC voltage from the battery to enable the lamp in the fixture to be illuminated during emergency operation upon failure of the DC power supply.

17 Claims, 1 Drawing Sheet

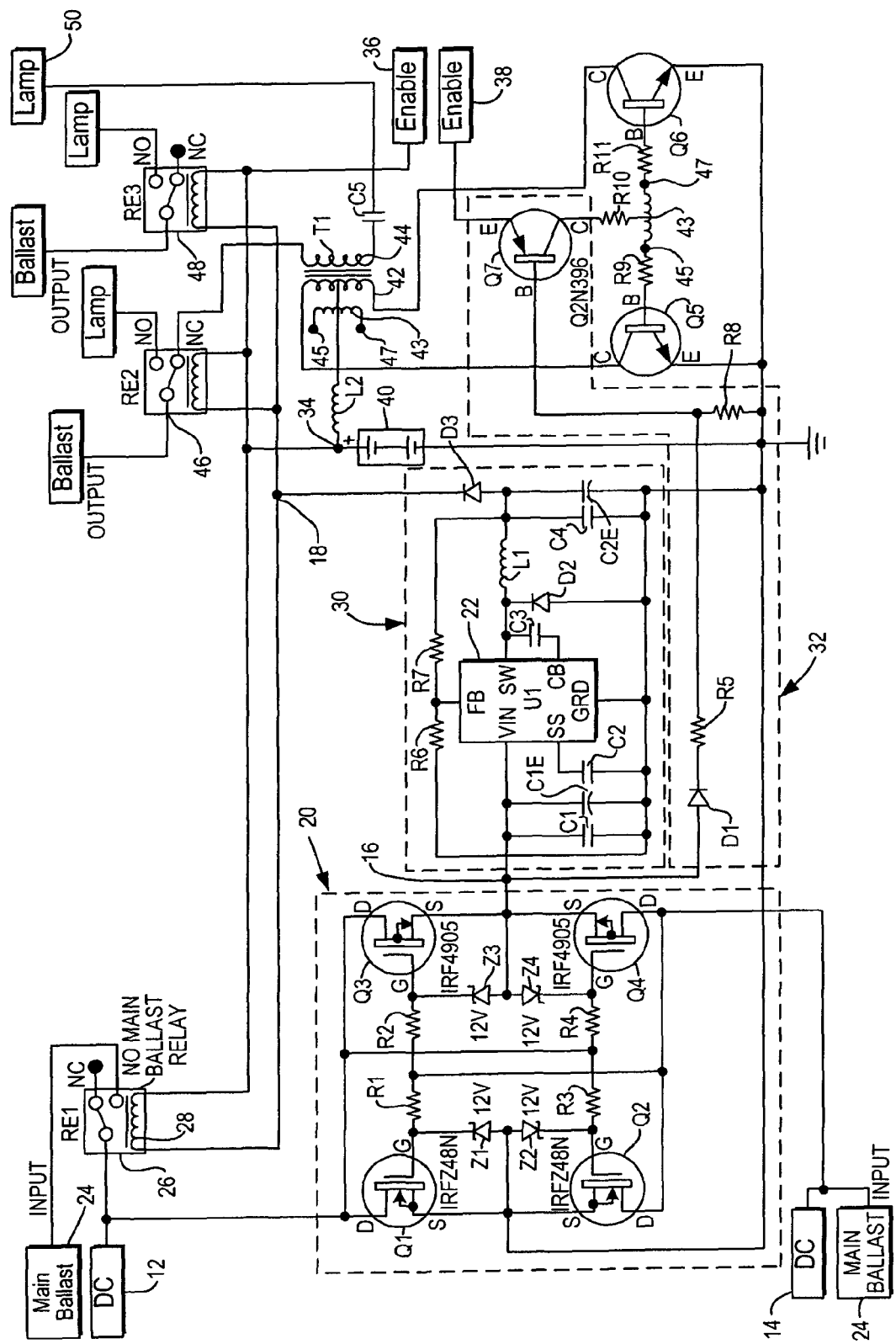

HIGH-EFFICIENCY DC BALLAST ARRANGEMENT WITH AUTOMATIC POLARITY PROTECTION AND EMERGENCY BACK-UP FOR LIGHTING FIXTURE IN A SUSPENDED DC-POWERED CEILING SYSTEM

DESCRIPTION OF THE RELATED ART

A conventional suspended or drop ceiling system in a building structure includes a grid framework of mutually orthogonal, longitudinally- and transversely-extending, frame elements lying in a ceiling plane and intersecting to form a plurality of polygonal openings, typically quadrilateral, into which lighting fixtures, ceiling tiles, air ducts, loudspeakers and like ceiling members are inserted and supported. The ceiling system provides, among other things, a visual, and often acoustic, barrier to building infrastructure, such as sprinkler pipes, water pipes, air conditioning duct work, electrical conduits, electrical power cables, telephone cables, computer network cables, cable trays, electrical junction boxes, as well as other mechanical and electrical services, routinely mounted in an overhead plenum or space between a real ceiling of the building structure and the suspended framework.

It is desirable to supply direct current (DC) voltage to power diverse electrical equipment in an office or home environment and, hence, the art has proposed, for example, in U.S. Pat. No. 7,661,229 to integrate a DC power supply into the ceiling system by incorporating and supporting electrical conductors or wires into and along the frame elements. The wires are connected to positive and negative terminals of the DC power supply. Electrical taps are used to connect the positive and negative power supply terminals to input terminals on the electrical equipment.

It is further desirable to power a lighting fixture, for example, a fluorescent lighting fixture having a DC ballast, from the above-described DC-powered ceiling system. The lighting fixture is mounted in any selected one of the openings, for example, directly in any selected opening in a new installation, or, in an existing installation, a new lighting fixture may replace another lighting fixture in the same opening, or an existing lighting fixture may be relocated from one opening to another opening to suit different lighting requirements. The lighting fixture is mountable, either deliberately or inadvertently, in different orientations in the selected opening, that is, the lighting fixture can be mounted in a longitudinal direction of the longitudinally-extending frame elements, or can be turned ninety degrees and can be mounted in a transverse direction of the transversely-extending frame elements.

These different orientations, however, can create a DC polarity problem for the DC ballast, since the lighting fixture will only be correctly powered by the DC power supply in one orientation, and incorrectly powered by the DC power supply in another orientation. More particularly, the ballast has one DC input positive terminal that must be connected to the positive terminal of the DC power supply, and another DC input negative terminal that must be connected to the negative terminal of the DC power supply. These proper electrical connections are made in one orientation of the lighting fixture, but not in another orientation of the lighting fixture. The lighting fixture will, of course, not work properly with an improper electrical connection and, indeed, may be damaged, thereby requiring repair and/or replacement.

SUMMARY OF THE INVENTION

One feature of the present invention resides, briefly stated, in a ballast arrangement for a lighting fixture, preferably having one or more fluorescent lamps and a ballast, mounted in a suspended ceiling system having a grid framework of intersecting, longitudinally-and transversely-extending, frame elements lying in a ceiling plane and bounding a plurality of openings. The ceiling system is DC-powered and has a direct current (DC) power supply to power electrical equipment, such as the lighting fixture, in an office or home environment. The lighting fixture is mounted in any selected one of the openings and is positionable, either deliberately or inadvertently, in different orientations in the selected opening, that is, the fixture can be mounted in a longitudinal direction of the longitudinal frame elements, or can be turned ninety degrees and can be mounted in a transverse direction of the transverse frame elements.

As discussed above, these different orientations create a DC polarity problem, since the lighting fixture ballast of the prior art will only be correctly powered by the DC power supply in one orientation, and will be incorrectly powered by the DC power supply in another orientation. More particularly, the prior art ballast has one DC input positive terminal that must be connected to a positive terminal of the DC power supply, and another DC input negative terminal that must be connected to a negative terminal of the DC power supply.

In accordance with one aspect of this invention, the ballast arrangement of this invention has an automatic polarity protection circuit that is connected to a pair of DC input terminals for supplying an output DC voltage of constant polarity no matter in which of the orientations the fixture is mounted. Thus, no matter whether the positive terminal or the negative terminal of the DC power supply is connected to either input terminal of the ballast arrangement, the output DC voltage will always be generated with the same polarity, for example, a positive polarity. Thus, the positioning of the lighting fixture in the selected opening is not as critical as in the prior art.

In a preferred embodiment, the protection circuit is a high-efficiency, DC-to-DC bridge and includes a first branch circuit having a first pair of metal oxide semiconductor field-effect transistors (MOSFETS) of opposite type, and a second branch circuit having a second pair of MOSFETS of opposite type, the branch circuits being bridged together between the first pair of MOSFETS and the second pair of MOSFETS. The protection circuit also includes a plurality of zener diodes for maintaining bias voltages at gates of the MOSFETS at stable values. The output DC voltage from the protection circuit differs from a supply DC voltage from the DC power supply by less than one-tenth of a volt due to the low insertion losses of the MOSFETS. This contrasts favorably to conventional diode-based bridges, which have much higher insertion losses and, therefore, a lower efficiency.

The ballast arrangement includes a main DC ballast circuit including a main DC ballast powered by the output DC voltage from the protection circuit to enable a lamp in the fixture to be illuminated during normal operation, and an emergency back-up DC ballast circuit to enable the lamp in the fixture to be illuminated during emergency operation upon failure of the DC power supply. A sensing circuit advantageously senses failure of the DC power supply, and enables the emergency back-up DC ballast circuit when such failure has been sensed. The emergency back-up DC ballast circuit includes a battery charged to a charged DC voltage by the output DC voltage during the normal operation, and an emergency DC ballast powered by the charged DC voltage from the battery to enable the lamp in the fixture to be illuminated during the emergency operation.

The ballast arrangement further includes a high-efficiency, DC-to-DC converter between the protection circuit and the emergency back-up DC ballast circuit for converting and reducing the output DC voltage to a reduced DC voltage for powering the ballast circuits. The DC-to-DC converter has an active integrated circuit controller chip and a low insertion loss. This contrasts favorably to conventional converters having passive components, such as resistors, which have much higher insertion losses and, therefore, a lower efficiency.

In accordance with another aspect of this invention, a method of mounting and operating a lighting fixture mountable in different orientations in a selected opening bounded by frame elements of a grid framework in a DC-powered suspended ceiling system having a DC power supply is performed by connecting a pair of DC input terminals to the DC power supply with a predetermined polarity in one orientation of the fixture, and with a reverse polarity in another orientation of the fixture; connecting an automatic polarity protection circuit to the DC input terminals for supplying an output DC voltage of constant polarity no matter in which of the orientations the fixture is mounted; powering a main DC ballast circuit including a main DC ballast by the output DC voltage from the protection circuit to enable a lamp in the fixture to be illuminated during normal operation; and enabling the lamp in the fixture to be illuminated during emergency operation by an emergency back-up DC ballast circuit to upon failure of the DC power supply, including charging a battery to a charged DC voltage by the output DC voltage during the normal operation, and powering an emergency DC ballast by the charged DC voltage from the battery to enable the lamp in the fixture to be illuminated during the emergency operation.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an electrical schematic of a ballast arrangement in accordance with this invention.

DETAILED DESCRIPTION OF THE PREFERRED EMBODIMENTS

FIG. 1 is an electrical schematic of a ballast arrangement for a lighting fixture, preferably having one or more fluorescent lamps, mounted and supported in a selected opening bounded by mutually orthogonal, longitudinally- and transversely-extending, frame elements lying in a ceiling plane and intersecting to form a plurality of polygonal openings, typically quadrilateral, in a grid framework of a DC-powered suspended or drop ceiling system of the type described in U.S. Pat. No. 7,661,229, the entire disclosure of which is hereby incorporated by reference herein. A DC power supply is integrated into the ceiling system by incorporating and supporting electrical conductors or wires into and along the frame elements. The wires are connected to positive and negative terminals of the DC power supply.

The fixture has a complementary contour to that of its supporting opening. The opening is preferably square in shape, typically sized at 2 feet by 2 feet, or 4 feet by 4 feet. The lighting fixture is mountable, either deliberately or inadvertently, in different orientations in the selected opening, that is, the lighting fixture can be mounted in a longitudinal direction of the longitudinally-extending frame elements, or can be turned ninety degrees and can be mounted in a transverse direction of the transversely-extending frame elements. The frame elements are each preferably formed, e.g., by folding and stamping, from a single piece of sheet metal. Each frame element has a generally horizontal flange portion on which the fixture is supported around its periphery, and a vertical web portion. Ceiling members, other than light fixtures, such as air ducts, loudspeakers and the like, could also be supported in the respective openings. The ceiling system is suspended from a real ceiling of a building structure by threaded rods or ceiling wires.

As discussed above, these different orientations of the fixture create a DC polarity problem, since a lighting fixture ballast of the prior art will only be correctly powered by the DC power supply in one orientation, and will be incorrectly powered by the DC power supply in another orientation. More particularly, the prior art ballast has one DC input positive terminal that must be connected to a positive terminal of the DC power supply, and another DC input negative terminal that must be connected to a negative terminal of the DC power supply. The lighting fixture will, of course, not work properly with an improper electrical connection.

In accordance with one aspect of this invention, the ballast arrangement has a pair of DC input terminals 12, 14 (see FIG. 1) connected to the positive and negative terminals of the DC power supply, e.g., 24 VDC, with a predetermined polarity in one orientation of the fixture, and with a reverse polarity in another orientation of the fixture. An automatic polarity protection circuit 20 is connected to the DC input terminals 12, 14 for supplying an output DC voltage of constant polarity at output 16 no matter in which of the orientations the fixture is mounted. Thus, no matter whether the positive terminal or the negative terminal of the DC power supply is connected to either the input terminal 12 or the input terminal 14 of the ballast arrangement, the output DC voltage at output 16 will always be generated with the same polarity. For example, if a positive or a negative voltage is applied to either input terminal 12 or input terminal 14, then the output DC voltage will always be a positive voltage. Thus, the positioning of the lighting fixture in the selected opening is not as critical as in the prior art.

In a preferred embodiment, the protection circuit 20 is a high-efficiency, DC-to-DC bridge and includes a first branch circuit having a first pair of metal oxide semiconductor field-effect transistors (MOSFETS) Q1, Q3 of opposite respective p- and n-types, and a second branch circuit having a second pair of MOSFETS Q2, Q4 of opposite respective n- and p-types, the branch circuits being bridged together between the first pair of MOSFETS Q1, Q3 and the second pair of MOSFETS Q2, Q4. The protection circuit also includes a plurality of zener diodes Z1, Z2, Z3, Z4 for maintaining bias voltages at gates of the MOSFETS Q1, Q2, Q3, Q4 at stable values. The output DC voltage at output 16 from the protection circuit 20 differs from a supply DC voltage, e.g., 24 VDC, from the DC power supply by less than one-tenth of a volt due to the low insertion losses of the MOSFETS Q1, Q2, Q3, Q4. This contrasts favorably to conventional diode-based bridges, which have much higher insertion losses and, therefore, a lower efficiency.

In operation, if a positive DC voltage is applied at input terminal 12, then Q1 is turned off; Q2 is turned on; Q3 is turned on; and Q4 is turned off; and the output DC voltage at output 16 is positive. If a negative DC voltage is applied at input terminal 12, then Q1 is turned on; Q2 is turned off; Q3 is turned off; and Q4 is turned on; and the output DC voltage at output 16 is still positive.

The ballast arrangement further includes a high-efficiency, DC-to-DC converter 30 connected to the protection circuit 20 for converting and reducing the output DC voltage at output 16 to a reduced DC voltage, e.g., about 5 VDC, at output 18. The DC-to-DC converter 30 has an active integrated circuit controller chip 22 and a low insertion loss. This contrasts favorably to conventional converters having passive components, such as resistors, which have much higher insertion losses and, therefore, a lower efficiency.

The ballast arrangement further includes a main DC ballast circuit including a main DC ballast 24 powered by the reduced DC voltage from the DC-to-DC converter 30 via a relay (RE1) 26 to enable a lamp in the fixture to be illuminated during normal operation. The reduced DC voltage at output 18 energizes a coil 28 in the relay 26 that switches the relay 26 from a normally-closed (NC) state to a normally-open (NO) state in which the DC supply voltage at terminals 12, 14 is applied to the input leads of the main DC ballast 24, thereby enabling the lamp to be illuminated during normal operation.

The ballast arrangement further includes a sensing circuit 32 for sensing failure of the DC power supply, as described in detail below, and an emergency back-up DC ballast circuit to enable the lamp in the fixture to be illuminated during emergency operation upon sensing the failure of the DC power supply by the sensing circuit 32. The emergency back-up DC ballast circuit includes a rechargeable battery 40 charged to a charged DC voltage by the reduced DC voltage at output 18 passing through the coil 28 to a terminal 34 of the battery 40 during the normal operation, and an emergency DC ballast powered by the charged DC voltage at the battery terminal 34 to enable the lamp in the fixture to be illuminated during the emergency operation.

The emergency DC ballast includes a push-pull oscillator having a pair of transistors Q5, Q6 arranged to oscillate at a resonant frequency between 20 kHz to 60 kHz. The oscillator is connected across a first primary coil 42 of a transformer T1. A secondary coil 44 of the transformer T1 is connected across the lamp 50. The charged DC voltage at the battery terminal 34 is connected to a center tap of the primary coil 42, thereby energizing the transformer T1 and causing the lamp 50 to be illuminated during the emergency operation.

When shipped, two enable connectors 36, 38 are separated from each other but, during installation of the ballast arrangement, the enable connectors 36, 38 are interconnected, thereby enabling the reduced DC voltage at output 18 to pass through the coil 28 and the interconnected connectors 36, 38 to the emitter of a transistor Q7 during the normal operation. The base of the transistor Q7 is connected via the sensing circuit 32 to the output DC positive voltage at output 16. The collector of the transistor Q7 is connected to a center tap of a second primary coil 43 of the transformer T1. The second primary coil 43 and its terminals 45, 47 have been shown twice in FIG. 1 to simplify the electrical connections in the drawing. During the normal operation, Q7 is biased off, thereby preventing the push-pull oscillator from oscillating. However, during an emergency, the DC power supply fails, and the output DC voltage is no longer present at output 16. This emergency is detected by the sensing circuit 32, and Q7 is now biased on, and the push-pull oscillator now begins oscillating and actuating the second primary coil 43 of the transformer, which in turn actuates the secondary coil 44.

Relay (RE2) 46 and relay (RE3) 48 are provided to prevent damage to the ballast arrangement if it is operating in an "instant start" mode or a "rapid start" mode. Each relay 46, 48 is switched from a normally-closed (NC) state to a normally-open (NO) state in which one or both output leads from the ballast are disconnected.

The ballast arrangement of this invention achieves an efficiency on the order of over 90%. This contrast to prior art ballast arrangements whose efficiencies are on the order of 60% to 70%.

It will be understood that each of the elements described above, or two or more together, also may find a useful application in other types of constructions differing from the types described above.

While the invention has been illustrated and described as a ballast arrangement with emergency back-up for a fluorescent light fixture mounted in a DC-powered suspended ceiling system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A ballast arrangement for a lighting fixture mountable in different orientations in a suspended ceiling system having a DC power supply, comprising:
    a pair of DC input terminals connected to the DC power supply with a predetermined polarity in one orientation of the fixture, and with a reverse polarity in another orientation of the fixture;
    an automatic polarity protection circuit connected to the DC input terminals for supplying an output DC voltage of constant polarity no matter in which of the orientations the fixture is mounted;
    a main DC ballast circuit including a main DC ballast powered by the output DC voltage from the protection circuit to enable a lamp in the fixture to be illuminated during normal operation; and
    an emergency back-up DC ballast circuit to enable the lamp in the fixture to be illuminated during emergency operation upon failure of the DC power supply, the emergency back-up DC ballast circuit including a battery charged to a charged DC voltage by the output DC voltage during the normal operation, and an emergency DC ballast powered by the charged DC voltage from the battery to enable the lamp in the fixture to be illuminated during the emergency operation.

2. The ballast arrangement of claim 1, wherein the protection circuit is a high-efficiency, DC-to-DC bridge and includes a first branch circuit having a first pair of metal oxide semiconductor field-effect transistors (MOSFETS) of opposite type, and a second branch circuit having a second pair of MOSFETS of opposite type, the branch circuits being bridged together between the first pair of MOSFETS and the second pair of MOSFETS.

3. The ballast arrangement of claim 2, wherein the protection circuit includes a plurality of zener diodes for maintaining bias voltages at gates of the MOSFETS at stable values.

4. The ballast arrangement of claim 2, wherein the output DC voltage from the protection circuit differs from a supply DC voltage from the DC power supply by less than one-tenth of a volt due to low insertion losses of the MOSFETS of the high-efficiency, DC-to-DC bridge.

5. The ballast arrangement of claim 1, and a high-efficiency, DC-to-DC converter between the protection circuit and the emergency back-up DC ballast circuit for converting and reducing the output DC voltage to a reduced DC voltage for powering the ballast circuits.

6. The ballast arrangement of claim 5, wherein the DC-to-DC converter has an active integrated circuit controller chip and a low insertion loss.

7. The ballast arrangement of claim 1, and a sensing circuit for sensing failure of the DC power supply, and for enabling the emergency back-up DC ballast circuit when such failure has been sensed.

8. The ballast arrangement of claim 1, and a housing for supporting the ballast arrangement in either of the orientations in an opening in a framework of the suspended ceiling system.

9. A ballast arrangement for a fluorescent lighting fixture mountable in different orientations in an opening bounded by frame elements in a grid framework of a suspended ceiling system having a DC power supply, comprising:
 a pair of DC input terminals connected to the DC power supply with a predetermined polarity in one orientation of the fixture, and with a reverse polarity in another orientation of the fixture;
 an automatic polarity protection circuit including a high-efficiency, DC-to-DC bridge connected to the DC input terminals for supplying an output DC voltage of constant polarity no matter in which of the orientations the fixture is mounted;
 a high-efficiency, DC-to-DC converter connected to the protection circuit for converting and reducing the output DC voltage to a reduced DC voltage;
 a main DC ballast circuit including a main DC ballast powered by the reduced DC voltage from the DC-to-DC converter to enable a lamp in the fixture to be illuminated during normal operation;
 a sensing circuit for sensing failure of the DC power supply; and
 an emergency back-up DC ballast circuit to enable the lamp in the fixture to be illuminated during emergency operation upon sensing the failure of the DC power supply by the sensing circuit, the emergency back-up DC ballast circuit including a battery charged to a charged DC voltage by the reduced DC voltage during the normal operation, and an emergency DC ballast powered by the charged DC voltage from the battery to enable the lamp in the fixture to be illuminated during the emergency operation.

10. The ballast arrangement of claim 9, wherein the DC-to-DC bridge includes a first branch circuit having a first pair of metal oxide semiconductor field-effect transistors (MOSFETS) of opposite type, and a second branch circuit having a second pair of MOSFETS of opposite type, the branch circuits being bridged together between the first pair of MOSFETS and the second pair of MOSFETS.

11. In a suspended ceiling system having a DC power supply and a grid framework of frame elements lying in a ceiling plane and bounding a plurality of openings, a method of mounting and operating a lighting fixture mountable in different orientations in the system, the method comprising the steps of:
 mounting the lighting fixture in a selected one of the orientations in a selected one of the openings;
 connecting a pair of DC input terminals to the DC power supply with a predetermined polarity in one orientation of the fixture, and with a reverse polarity in another orientation of the fixture;
 connecting an automatic polarity protection circuit to the DC input terminals for supplying an output DC voltage of constant polarity no matter in which of the orientations the fixture is mounted;
 powering a main DC ballast circuit including a main DC ballast by the output DC voltage from the protection circuit to enable a lamp in the fixture to be illuminated during normal operation; and
 enabling the lamp in the fixture to be illuminated during emergency operation by an emergency back-up DC ballast circuit to upon failure of the DC power supply, including charging a battery to a charged DC voltage by the output DC voltage during the normal operation, and powering an emergency DC ballast by the charged DC voltage from the battery to enable the lamp in the fixture to be illuminated during the emergency operation.

12. The method of claim 11, and configuring the protection circuit as a high-efficiency, DC-to-DC bridge that includes a first branch circuit having a first pair of metal oxide semiconductor field-effect transistors (MOSFETS) of opposite type, and a second branch circuit having a second pair of MOSFETS of opposite type, and bridging the branch circuits together between the first pair of MOSFETS and the second pair of MOSFETS.

13. The method of claim 12, and maintaining bias voltages at gates of the MOSFETS at stable values.

14. The method of claim 12, wherein the output DC voltage from the protection circuit differs from a supply DC voltage from the DC power supply by less than one-tenth of a volt due to low insertion losses of the MOSFETS of the high-efficiency, DC-to-DC bridge.

15. The method of claim 11, and converting and reducing the output DC voltage to a reduced DC voltage for powering the ballast circuits with a high-efficiency, DC-to-DC converter between the protection circuit and the emergency back-up DC ballast circuit.

16. The method of claim 15, and configuring the DC-to-DC converter with an active integrated circuit controller chip and a low insertion loss.

17. The method of claim 11, and sensing failure of the DC power supply, and enabling the emergency back-up DC ballast circuit when such failure has been sensed.

* * * * *